United States Patent
Spuller

(10) Patent No.: US 7,326,047 B2
(45) Date of Patent: Feb. 5, 2008

(54) APPARATUS FOR PRODUCING A TUBULAR BODY

(75) Inventor: Swen Spuller, Forchheim (DE)

(73) Assignee: Otto Männer Innovation GmbH, Balingen (DE)

( * ) Notice: Subject to any disclaimer, the term of this patent is extended or adjusted under 35 U.S.C. 154(b) by 289 days.

(21) Appl. No.: 11/254,582

(22) Filed: Oct. 20, 2005

(65) Prior Publication Data
US 2006/0088620 A1 Apr. 27, 2006

(30) Foreign Application Priority Data
Oct. 23, 2004 (DE) ........................ 10 2004 051 744

(51) Int. Cl.
*B29C 45/20* (2006.01)

(52) U.S. Cl. ...................... 425/562; 425/566; 425/571; 425/577; 425/594

(58) Field of Classification Search ........ 425/562–569, 425/571, 577, 589, 594
See application file for complete search history.

(56) References Cited

U.S. PATENT DOCUMENTS 4,781,573 A * 11/1988 Depreter ..................... 425/577
5,820,803 A * 10/1998 Hashimoto .................. 425/566

* cited by examiner

*Primary Examiner*—Yogendra N. Gupta
*Assistant Examiner*—Thu Khanh T. Nguyen
(74) *Attorney, Agent, or Firm*—Klaus J. Bach

(57) ABSTRACT

In an apparatus for producing a tubular body with a membrane forming a separating wall extending across the interior of the tubular body, an injection mold is provided including a cylindrical hollow space corresponding to the outer wall of the tubular body and a pin is disposed in the cylindrical chamber in spaced relationship with the wall thereof so as to form a tubular passage, wherein the pin includes upper and lower parts which are movable relative to each other so as to form an adjustable gap between which is in communication circumferentially with the tubular passage.

9 Claims, 3 Drawing Sheets

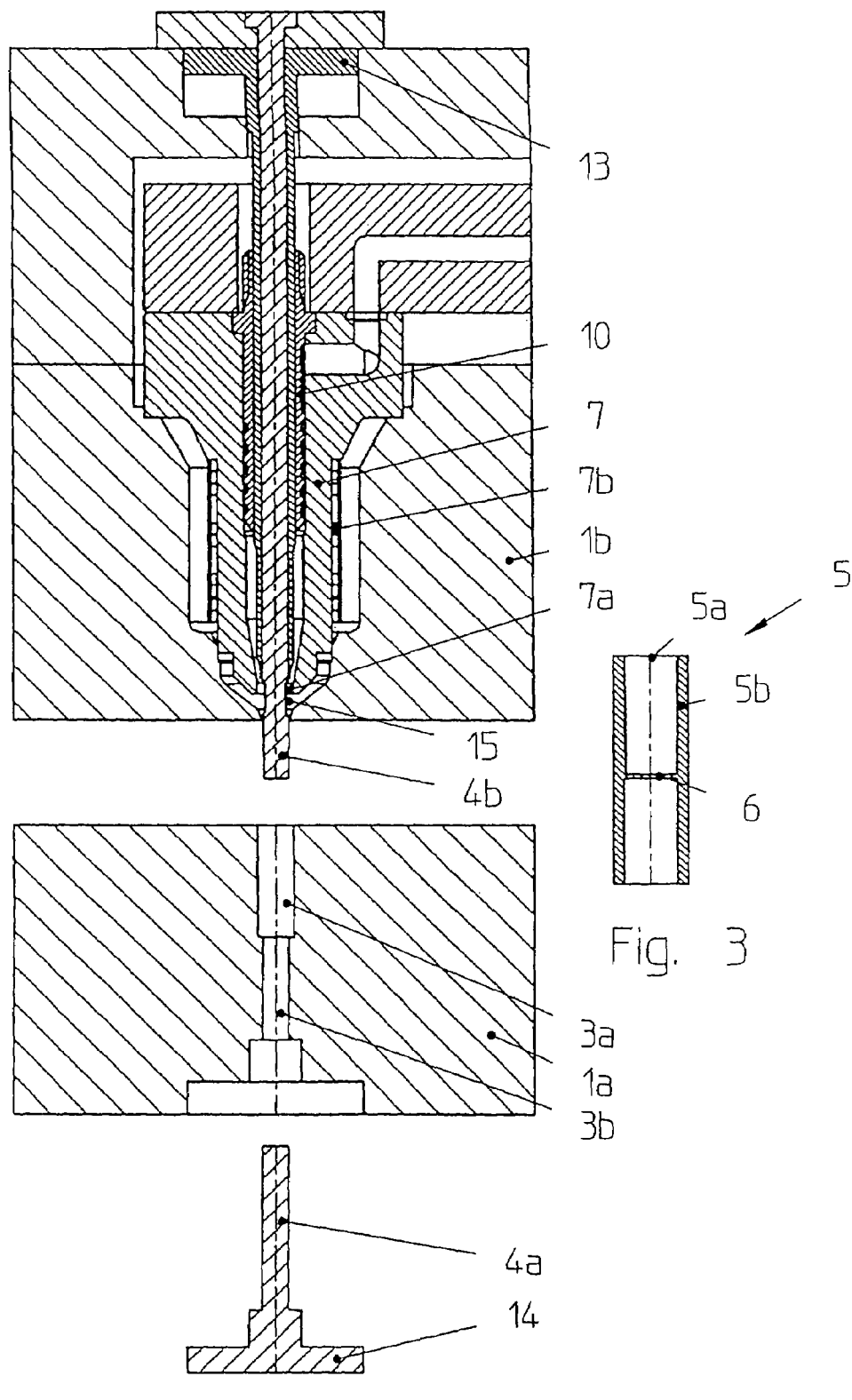

APPARATUS FOR PRODUCING A TUBULAR BODY

BACKGROUND OF THE INVENTION

The invention relates to an apparatus for producing a tubular body which includes in its interior a separating wall which extends transverse to the longitudinal axis of the tubular body. The apparatus includes an injection mold having an opening which corresponds to the wall of the annular body and in which pins are arranged to form a narrow annular space in the opening.

Such a tubular body is used for example in the medical field in the administration of infusions. In this case, the body is disposed on a spigot shaped part of the outlet opening of an infusion container. The outlet opening of the infusion container is closed by a membrane-like separation wall. For the administration of the infusion, the opening of the tubular body facing away from the outlet opening is connected to a conduit which, at its front end, is so formed that it can penetrate the membrane-like separation wall whereby the closure of the infusion container is destroyed and the content of the infusion container flows through the tubular body into the infusion line.

Since the infusion container must be tightly closed by the tubular body, the membrane-like separation wall must be tightly connected to the wall of the tubular body. Furthermore, the membrane-like separation wall must be very thin so that it can be penetrated without great efforts. If the body would be produced in the known way by an injection molding tool, the membrane-like separation wall would not be thin enough to be penetrated in a simple manner. For a melt to flow into a gap of a molding tool in order to form such a membrane-like separation wall, this gap would have to have a width of one to two millimeter. However, a membrane with a thickness of one to two millimeters cannot be penetrated easily.

For the production of the bodies, the membrane-like separation wall is therefore manufactured in the known manner by injection molding stamping wherein the thickness of the separating wall is about 0.2 to 0.3 mm. The membrane is then installed in the interior of a small tube which is manufactured in a conventional way for example by a tube casting process and is connected to the tube by ultrasound welding. This however, is on one hand very expensive and, on the other hand, flaws may develop during the ultrasound welding whereby the membrane is not sealingly connected to the wall of the tubes.

It is therefore the object of the present invention to provide an apparatus for producing a tubular body with a thin separating wall, which can be easily pierced and which is sealingly disposed in the tubular body in a simple manner.

SUMMARY OF THE INVENTION

In an apparatus for producing a tubular body with a membrane forming a separating wall extending across the interior of the tubular body, an injection mold is provided including a cylindrical hollow space corresponding to the outer wall of the tubular body and a pin is disposed in the cylindrical chamber in spaced relationship with the wall thereof so as to form a tubular passage, wherein the pin includes upper and lower parts which are movable relative to each other so as to form an adjustable gap between which is in communication circumferentially with the tubular passage.

With the pin consisting of an upper part and a lower part and one of the parts being axially movable, the gap which is formed between the opposite front faces of the pins and by which the membrane-like separation wall is formed, can be changed. As a result, the gap can advantageously be set first to be relatively wide so that the gap is completely filled during the injection molding procedure and is subsequently reduced to such an extent that the distance between the front faces of the pin parts corresponds to the desired thickness of the membrane-like separation wall. With the apparatus according to the invention, it is therefore possible to produce the tubular body as a single piece by injection molding with a membrane-like separation wall which is as thin as desired.

With the apparatus according to the invention, the advantages which are obtained with an integral molding of the separating wall are combined with the advantages obtained by injection molding stamping wherein however the tubular body and the thin membrane are molded integrally in an advantageous manner. This has substantial advantages for the tightness and the integrity of the membrane.

In a particular embodiment according to the invention, an injection molding nozzle for introducing melt into the annular space includes an annular nozzle outlet opening. In this way, the melt can be introduced into the annular space in a very uniform way, which is very advantageous for the quality of the injection-molded body.

In another embodiment of the invention, a tubular closure element is provided for closing the nozzle outlet opening. In this way, the admission of the melt can be controlled on the basis of time. Therefore the nozzle opening can be left open until the two pin parts are disposed opposite each other with the predetermined distance corresponding to the desired thickness of the membrane-like separation wall.

In the last-mentioned embodiment, it is therefore particularly advantageous if the control arrangement can control the axial displacement of the movable pin part and the closure element. It is then easily possible to close the nozzle opening at an optimum point in time. For example, the nozzle opening can be closed already shortly before the movable pin part reaches its end position whereby the density of the injection molding part is increased.

It is also very advantageous if, as in another embodiment according to the invention, a minimum distance between the pin parts is adjustable. In this way, the thickness of the membrane-like separation wall can be set very accurately.

In another embodiment of the invention, a mixing element is provided which at least partially surrounds the closure element. With the mixing element, the melt flow is guided around the closure element in such a way that it re-combines behind the closure element without forming flow lines. The mixing element must therefore provide for good mixing of the melt behind the closure element.

This is achieved advantageously in that the mixing element includes in its surface channel-like recesses for guiding the melt along a path as predetermined by the channel-like recesses. Instead of a relative large volume contiguous mass flow, the melt is divided by the channel-like recesses into a multitude of individual flows which converge again behind the closure element. This results in an intense mixing of the melt behind the closure element, whereby no flow line can be established.

In the last mentioned embodiment, it is advantageous if the recesses forming the channels have different cross-sections. In this way, the mass flow of the melt can further be influenced. For example, if the cross-section is smaller in the area where the melt is admitted than in the area of the confluence of the melt flows after the mixing element, the axial melt mass flow behind the closure element can be adjusted to be just as large as the melt flow in front of the closure element inspite of the longer travel distance for the melt up to the point of confluence behind the closure element. With a corresponding configuration of the channel-shaped depressions, melt mass flow ring areas moving uniformly in axial direction of the closure element are obtained. This is particularly advantageous in connection with annular nozzle outlet openings.

The invention will become more readily apparent from the following description of a particular embodiment of the invention on the basis of the accompanying drawings.

BRIEF DESCRIPTION OF THE DRAWINGS

FIG. 2 is an exploded view of the apparatus shown in FIG. 1,

FIG. 3 shows in a section a tubular body formed according to the invention with a membrane-like separating wall disposed therein.

DESCRIPTION OF A PARTICULAR EMBODIMENT

Figure 1:
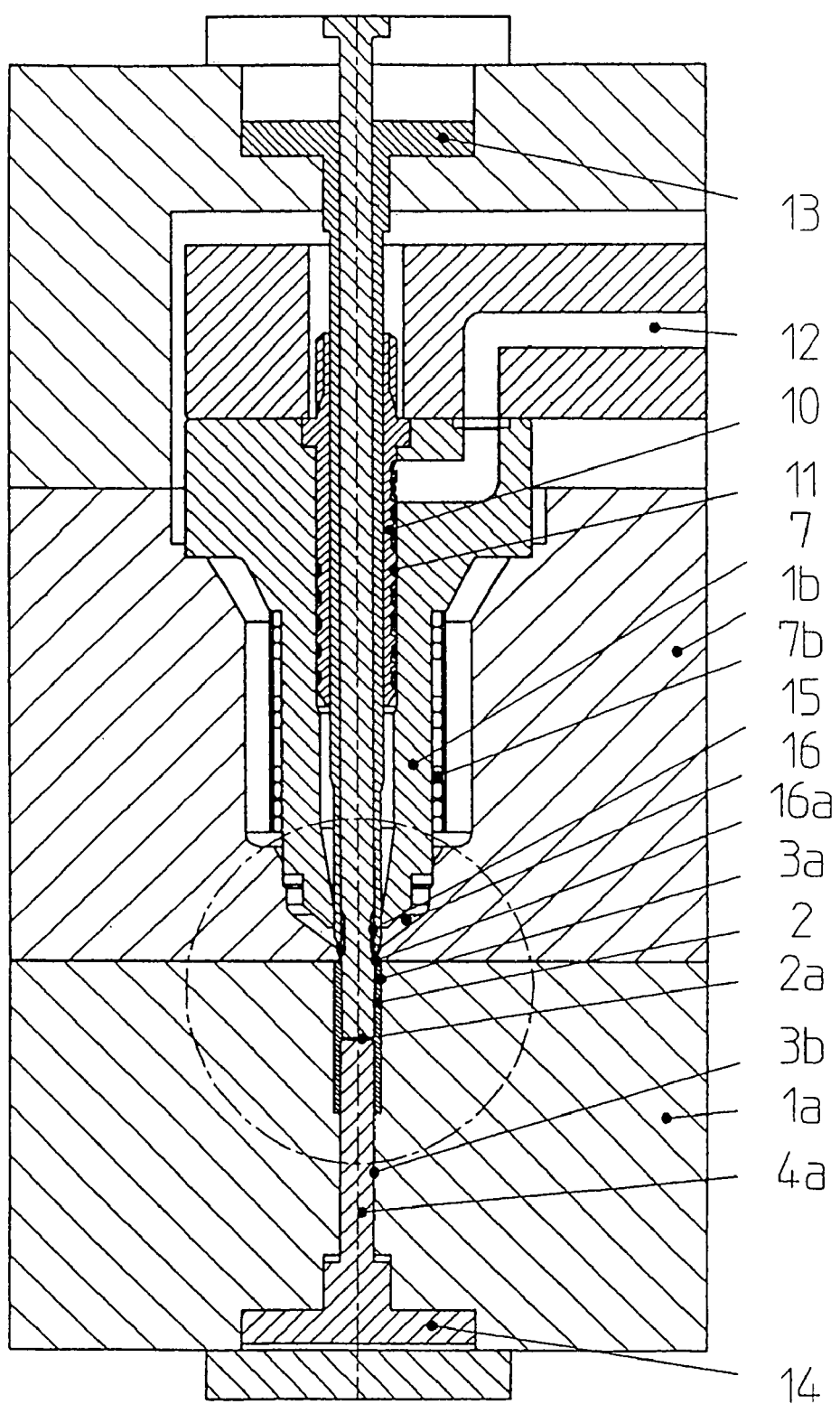
FIG. 1 is a cross-sectional view of the apparatus according to the invention.

As apparent particularly from FIGS. 1 and 2, an apparatus according to the invention comprises essentially an upper tool half 1b and a lower tool half 1a. The upper tool half 1b includes an injection nozzle 7 through which the upper part 4b of a pin 4a, 4b extends. The injection molding nozzle 7 has an annular nozzle outlet opening 7a, which leads to an annular space 16, which is formed in the upper tool half 1b and which surrounds the lower area of the injection nozzle 7. In this way, the conduction of heat away from the lower part of the injection nozzle 7 is prevented. Furthermore, the annular space 16 extends down to the lower tool half 1a, where the thickness of the annular space 16 is reduced to a gap of about half a millimeter. This so-called connecting gap 16a serves as a supply passage for the melt flowing to the tubular space 2 in the lower tool half 1a. The body of the injection nozzle 7 is partially surrounded by a heating coil 7b.

Through the lower tool half 1a, a stepped bore 3a, 3b extends in an axial direction. The diameter of the upper part 3a of the stepped bore 3a, 3b corresponds to the outer diameter of the annular body to be manufactured by the apparatus. The diameter of the lower part 3b of the stepped bore 3a, 3b corresponds to the diameter of the lower part 4a of the pin 4a, 4b. The diameter of the lower part 4a of the pin 4a, 4b corresponds at the same time to the inner diameter of the annular body 5 to be manufactured.

The diameter of the upper part of the pin 4a, 4b corresponds to the diameter of the lower part 4a of the pin 4a, 4b.

When the upper tool half 1b is placed onto the lower tool half the upper part 4b of the pin 4a, 4b, which is firmly connected to the upper tool half 1b, extends about half way into the upper part 3a of the stepped bore 3a, 3b. The lower part 4a of the pin 4a, 4b which is disposed axially movably in the lower tool half 1a and is axially movable by means of a piston 14 which extends in an assembled state into the dead end bore 3a, 3b to such an extent that the front faces of the two pins 4a, 4b are disposed opposite each other with a small gap of about two to three millimeter. When the piston 14 is actuated the distance is reduced to a minimum distance of 0.2 to 0.3 mm.

Although it is not shown in the figure, the stroke of the piston 14 can be so adjusted that the two end faces are disposed in both positions opposite each other with a pre-determined distance.

If the upper part 4b and the lower part 4a of the pin 4a, 4b are arranged in the upper part 3a of the dead end bore 3a and their end faces are disposed opposite each other in spaced relationship, a tubular space 2 is formed which corresponds to the annular body 5 to be formed by the apparatus. Since the front faces of the two pins 4a, 4b are disposed in spaced relationship a disc-like gap 2a is formed therebetween which extends laterally to the tubular space 2. Within this disc-like gap 2a, the membrane-like separation wall 6 of the tubular body 5 to be manufactured by the apparatus is formed.

Figure 4:
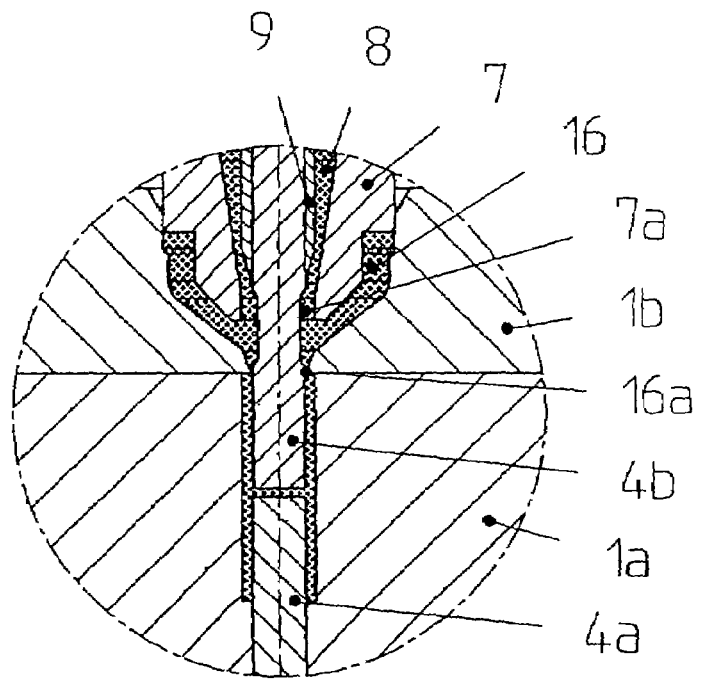
FIG. 4 is an enlarged view of the section encircled in FIG. 1 with the nozzle open.
Figure 5:
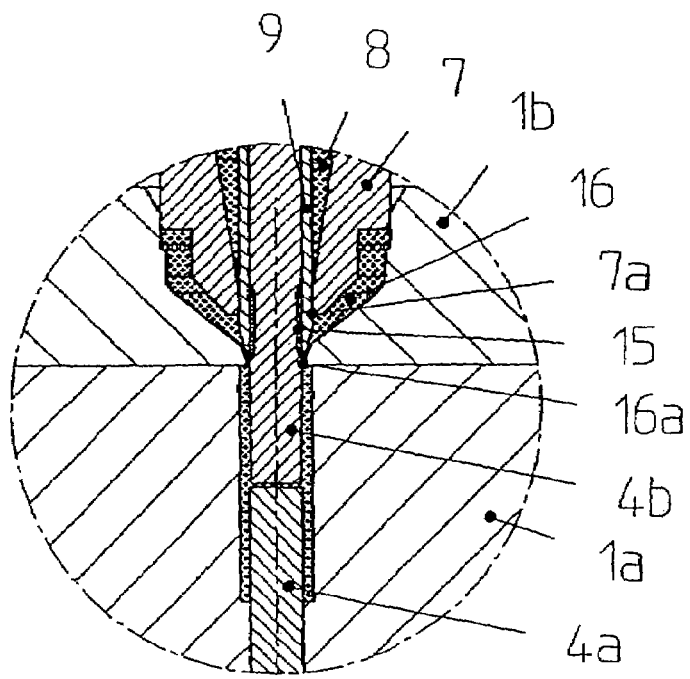
FIG. 5 is an enlarged view of the section encircled in FIG. 1 with the nozzle closed.

The upper part of pin 4a, 4b is surrounded by a tubular closure element 9. The closure element is axially movably supported on the upper part 4b of the pin 4a. In this way, the annular nozzle outlet opening 7a of the injection molding nozzle 7 and the connecting ring gap 16a can be closed as it is apparent particularly from the FIGS. 4 and 5. In FIG. 4, the closure element 9 is in its upper position so that the annular nozzle outlet opening 7a is open whereby melt 8 can flow out of the injection nozzle 7 into the annular space 16. In addition melt 8 can flow through the connecting gap 16a into the tubular space 2. In FIG. 5, the closure element 9 is in its lower position whereby the annular outlet opening 7a and the connecting gap 16a are closed so that no melt 8 can lea out of the connecting gap 16a.

The diameter of the upper part 4b of the pin 4a, 4b is somewhat reduced in the area of the stroke of the closure element 9. In this way, a clearance space 15 is provided whereby contact between the closure element 9 and the wall of the upper part 4b of the pin 4a, 4b is avoided. As a result, melt material deposited on the surface of the upper part 4b of the pin 4a, 4b which is already partially plasticized will not be shaved off the pin 4a, 4b and, consequently, not mix with the rest of the melt 8. Mixing of such particles with the melt 8 would result in a noticeable reduction in quality.

As shown particularly in FIG. 4, the distance between the two pin parts 4a, 4b is first so large that the disc-like gap 2a between them can be fully occupied by the melt 8. With the connecting gap 16a open, the tubular space 2 is filled with melt 8 which flows from the circumference of the annular gap 2 into the gap 2a and fully fills the gap 2a between the pins 4a, 4b. When the tubular space 2 and the disc-like gap 2a are fully filled with melt, the lower part 4a of the pin 4a, 4b is moved by the piston 14 toward the upper part 4b of the pin 4a, 4b, whereby the disc-like gap 2a becomes smaller and melt is pressed out of the disc-like gap 2a. In order to permit the melt 8 to flow out of the tubular space 2, the connecting gap 16a remains first open. If the connecting gap 16 is closed before the lower part of the pin 4a, 4b has approached the upper part 4b of the pin 4a, 4b melt 8 can no longer flow out of the annular gap 2 so that the melt is compressed, whereby the density of the melt and conse-quently of the annular body being formed is increased. The minimum distance between the confronting faces of the two pin parts 4a, 4b is so set that the membrane-like separation wall 6 has a thickness of 0.2 to 0.3 mm.

The closure element 9 includes at its end remote from the nozzle inlet opening 7a, a mixing element 10 in the form of a sleeve. By means of the mixing element 10, the closure element 9 is axially movable within the injection nozzle 7.

The sleeve-like mixing element 10 is provided at its surface with channel-like recesses by which the flow path of the melt is determined. The melt 8, which is conducted through a supply channel 12 into the interior of the injection nozzle 7, reaches first the surface of the mixing element 10 and then follows the path given by the channel-like depressions 11. As a result, the melt flow is divided into a multitude of flow lines which converge again at the rear end of the mixing element 10. With the multitude of flow paths, it is achieved in an advantageous way that the melt does not have any noticeable flow lines when rejoined at the end of the mixing element.

By varying the cross-section of the recesses, an axial melt flow at the exit end of the mixing sleeve 10 can be obtained which is about equal the flow at the entrance end of the mixing sleeve 10 where the supply channel 12 opens to the mixing sleeve 10 inspite of the longer distance of the melt flowing to the rear side of the mixing sleeve 10.

What is claimed is:

1. An apparatus for producing a tubular body (5), which includes in its interior a membrane forming a separating wall (6) extending transverse to the longitudinal axis (5*a*) of the tubular body (5), said apparatus including in injection mold (1*a*, 1*b*) having a chamber corresponding to the outer wall of the tubular body (5) to be formed, a pin (4*a*, 4*b*) disposed in the chamber in spaced relationship from the walls thereof to define with said outer walls a tubular space (2), said pin (4*a*, 4*b*) comprising an upper part (4*b*) and a lower part (4*a*) which are removable relative to one another so as to form an adjustable gap (2*a*) therebetween which is in communication circumferentially with the tubular hollow space (2).

2. An apparatus according to claim 1, wherein an injection molding nozzle (7) for supplying melt (8) to the tubular space (2) is provided, said injection molding nozzle (7) having an annular nozzle exit opening (7*a*).

3. An apparatus according to claim 2, wherein the nozzle exit opening (7*a*) extends to an annular hollow space (16) which is provided with an annular connecting gap (16*a*).

4. An apparatus according to claim 3, wherein said apparatus includes a tubular closure element (9) for closing the connecting gap (16*a*).

5. An apparatus according to claim 4, wherein the relative axial movement of the pin parts (4*a*, 4*b*) and the movement of the closure element (9) are controllable.

6. An apparatus according to claim 5, wherein an adjustable minimum distance is provided between the pin parts (4*a*, 4*b*).

7. An apparatus according to claim 4, wherein the apparatus includes a mixing element (10) which extends at least partially around the closure element (9).

8. An apparatus according to claim 7, wherein the mixing element (10) is provided at its surface with depressions (11) forming channels for guiding the melt flow.

9. An apparatus according to claim 8, wherein the depressions (11) have different cross-sections.

* * * * *